(12) United States Patent
Proudler

(10) Patent No.: US 8,584,245 B2
(45) Date of Patent: Nov. 12, 2013

(54) IDENTIFYING A TRUSTED COMPUTING ENTITY

(75) Inventor: Graeme John Proudler, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2920 days.

(21) Appl. No.: 10/162,020

(22) Filed: Jun. 3, 2002

(65) Prior Publication Data

US 2002/0180778 A1 Dec. 5, 2002

(30) Foreign Application Priority Data

Jun. 4, 2001 (GB) .................................. 0113566.4

(51) Int. Cl.
*G06F 21/00* (2013.01)

(52) U.S. Cl.
USPC ........................................ 726/25; 726/3; 726/4

(58) Field of Classification Search
USPC ............................ 726/3, 14, 25; 713/166, 194
See application file for complete search history.

(56) References Cited

U.S. PATENT DOCUMENTS

| | | | |
|---|---|---|---|
| 5,214,702 A | 5/1993 | Fischer | 380/30 |
| 5,280,583 A | 1/1994 | Nakayama et al. | 709/205 |
| 5,361,359 A | 11/1994 | Tajalli et al. | 395/700 |
| 5,473,692 A | 12/1995 | Davis | 380/25 |
| 5,572,590 A | 11/1996 | Chess | 713/20 |
| 5,619,571 A | 4/1997 | Sandstrom et al. | 380/4 |
| 5,659,616 A | 8/1997 | Sudia | 705/76 |
| 5,701,343 A | 12/1997 | Takashima et al. | 705/51 |
| 5,822,435 A | 10/1998 | Boebert et al. | |
| 5,867,579 A | 2/1999 | Saito | 705/57 |
| 5,870,721 A | 2/1999 | Norris | 705/38 |
| 5,903,732 A | 5/1999 | Reed et al. | 395/200.59 |
| 5,907,619 A | 5/1999 | Davis | 380/23 |
| 5,915,024 A | 6/1999 | Kitaori et al. | 713/176 |
| 5,953,528 A | 9/1999 | Sullivan | 395/703 |
| 5,953,538 A * | 9/1999 | Duncan et al. | 710/22 |
| 5,990,912 A | 11/1999 | Swanson | 345/568 |
| 6,018,724 A | 1/2000 | Arent | 705/44 |
| 6,023,765 A | 2/2000 | Kuhn | 713/200 |
| 6,029,245 A | 2/2000 | Scanlan | |
| 6,057,862 A | 5/2000 | Margulis | 345/535 |
| 6,064,764 A | 5/2000 | Bhaskaran et al. | |
| 6,138,239 A | 10/2000 | Veil | 713/200 |
| 6,212,636 B1 * | 4/2001 | Boyle et al. | 713/168 |
| 6,278,791 B1 | 8/2001 | Honsinger et al. | |
| 6,282,535 B1 | 8/2001 | Pham et al. | 707/4 |

(Continued)

FOREIGN PATENT DOCUMENTS

| | | |
|---|---|---|
| EP | 0 386 867 A2 | 9/1990 |
| EP | 0 717 337 A1 | 6/1996 |

(Continued)

OTHER PUBLICATIONS

Anderson, R., et al., "Tamper Resistance—a Cautionary Note," 16 pages, located at Internet address <www.cl.cam.ac.uk/~mgk25/tamper.html> (1996).

(Continued)

*Primary Examiner* — William Powers

(57) ABSTRACT

A computing platform for receiving one or more electronic sites or services from a remote target computing platform is adapted to indicate, visually or otherwise, to a user thereof that the target computing platform includes a physically and logically protected computing environment.

13 Claims, 5 Drawing Sheets

(56) References Cited

U.S. PATENT DOCUMENTS

| | | | |
|---|---|---|---|
| 6,330,670 B1 | 12/2001 | England et al. | 713/2 |
| 6,366,912 B1 * | 4/2002 | Wallent et al. | 707/9 |
| 6,453,416 B1 | 9/2002 | Epstein | 713/170 |
| 6,484,261 B1 * | 11/2002 | Wiegel | 726/11 |
| 6,515,988 B1 | 2/2003 | Eldridge et al. | 370/389 |
| 6,584,495 B1 * | 6/2003 | Bisset et al. | 709/217 |
| 6,606,744 B1 * | 8/2003 | Mikurak | 717/174 |
| 6,615,166 B1 * | 9/2003 | Guheen et al. | 703/27 |
| 6,671,805 B1 | 12/2003 | Brown et al. | 713/176 |
| 6,757,826 B1 | 6/2004 | Paltenghe | 713/170 |
| 6,775,536 B1 * | 8/2004 | Geiger et al. | 455/411 |
| 6,959,382 B1 | 10/2005 | Kinnis et al. | 713/170 |
| 7,162,525 B2 * | 1/2007 | Cofta et al. | 709/228 |
| 7,302,585 B1 | 11/2007 | Proudler et al. | |
| 2001/0016838 A1 | 8/2001 | Landrock | 705/80 |
| 2002/0012432 A1 | 1/2002 | England et al. | 380/231 |
| 2003/0030680 A1 * | 2/2003 | Cofta et al. | 345/864 |

FOREIGN PATENT DOCUMENTS

| | | |
|---|---|---|
| EP | 0 926 605 A1 | 6/1999 |
| EP | 1 030 237 A1 | 8/2000 |
| EP | 1 085 396 A1 | 3/2001 |
| EP | 1085396 | 3/2001 |
| GB | 0020441.2 | 8/2000 |
| WO | WO 94/01821 A1 | 1/1994 |
| WO | WO 00/31644 A1 | 6/2000 |
| WO | WO 00/54125 A1 | 6/2000 |
| WO | WO 00/48063 A1 | 8/2000 |
| WO | WO 00/54125 A1 | 9/2000 |
| WO | WO 00/54126 A1 | 9/2000 |
| WO | WO 00/73913 A1 | 12/2000 |
| WO | WO 01/27722 A1 | 4/2001 |

OTHER PUBLICATIONS

Wiseman, S., et al., "The Trusted Path between SMITE and the User," IEEE Proceedings of the Symposium on Security and Privacy, pp. 147-155 (1988).

Woo, T.Y.C., et al., "Authentication for Distributed Systems," Computer, vol. 25, No. 1, pp. 39-52 (Jan. 1992).

Intel, "Wired for management Baseline specification v.2.0," Boot Integrity Services Application Programming Interface Version 1.0, 64 pages (Dec. 28, 1998).

Building a Foundation of Trust in the PC, the Trusted computing Platform Alliance, 9 pages, located at Internet address, <www.trustedpc.org/home/home.html> (Jan. 2000).

U.S. Appl. No. 09/979,905, filed Nov. 27, 2001, Proudler et al.

U.S. Appl. No. 09/979,904, filed Nov. 27, 2001, Proudler et al.

Yee, B., "Using Secure Coprocessors," Doctoral thesis—Carnegie Mellon University, pp. 1-94 (May 1994).

*Boot Integrity Services Application Programming Interface*, Version 1.0, Intel Corporation, pp. 1-60 (Dec. 28, 1998).

"Building a Foundation of Trust in the PC," *Trusted Computing Platform Alliance*, pp. 1-7 (Jan. 2000).

"Information-technology—Security techniques—Entity authentication; Part 3: Mechanisms using digital signature techniques," *ISO/IEC* 9798-3, Second Edition, pp. 1-6 (1998).

"Information technology—Security techniques—Key management—Part 3: Mechanisms using asymmetric techniques," *ISO/IEC*11770-3, pp. 1-34 (1999).

Trusted Computing Platform Alliance, Main Specification Version 1.0, 284 pages (Jan. 25, 2001).

* cited by examiner

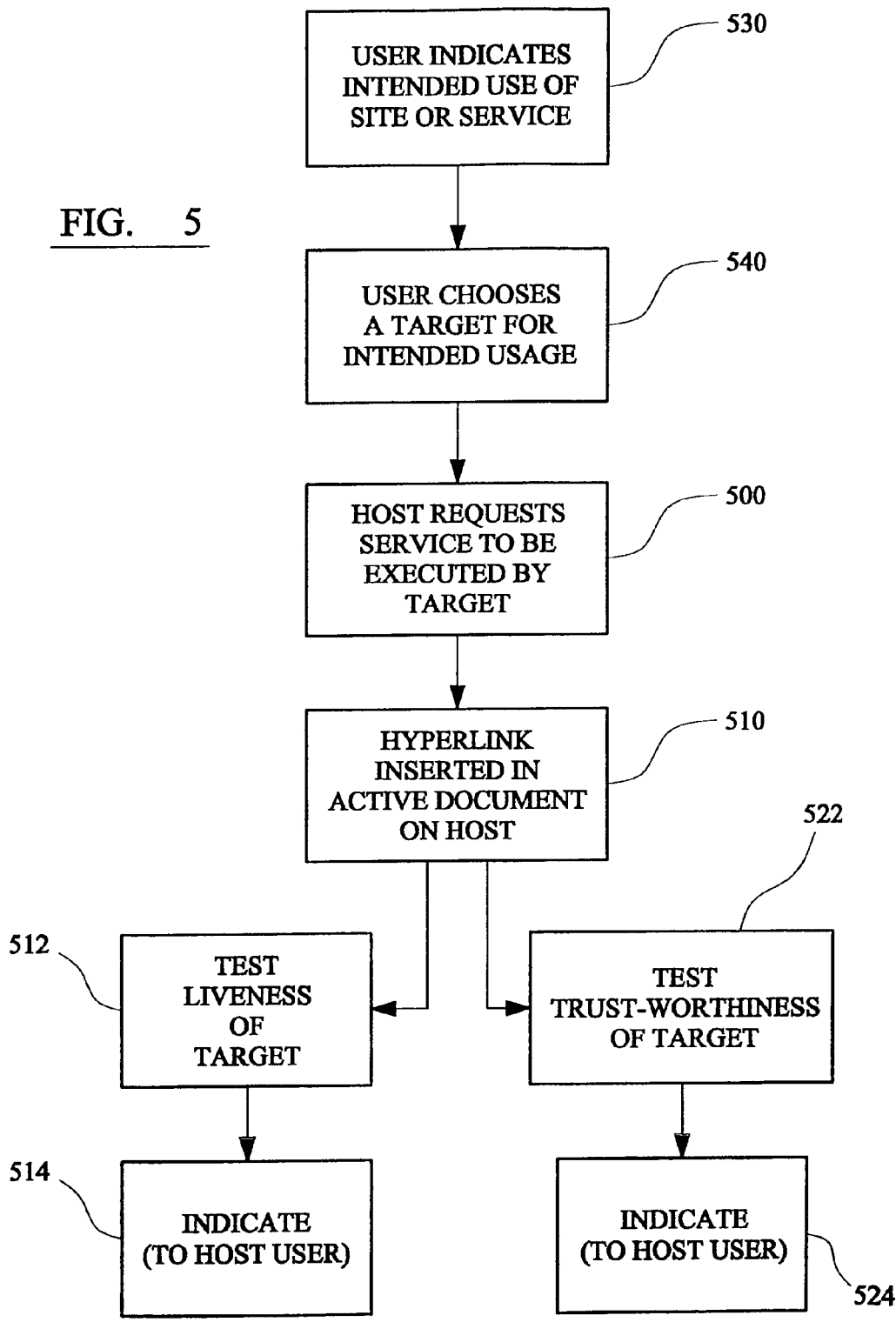

IDENTIFYING A TRUSTED COMPUTING ENTITY

CROSS REFERENCE TO RELATED APPLICATIONS

The subject matter of the present application may also be related to the following U.S. patent applications: "System for Providing a Trustworthy User Interface" Ser. No. 09/979,905, filed Nov. 27, 2001; and "System for Digitally Signing a Document," Ser. No. 09/979,904, filed Nov. 27, 2001.

FIELD OF THE INVENTION

This invention relates to the identification of a trusted computing entity and/or to monitoring or verifying the trustworthiness of a target computing entity.

BACKGROUND TO THE INVENTION

Conventional prior art mass market computing platforms include the well-known personal computer (PC), and a proliferation of known palmtop, laptop and mobile phone-type personal computers. Generally, markets for such machines fall into two categories, these being domestic or consumer, and corporate. A general requirement for a computing platform for domestic or consumer use is a relatively high processing power, Internet access features, and multi-media features for handling computer games.

On the other hand, for business use, there are a number of different proprietary computer platform solutions available aimed at organisations ranging from small businesses to multi-national organisations. In many of these applications, a server platform provides centralised data storage, and application functionality for a plurality of client stations. For business use, other key criteria are reliability, networking features and security features.

With the increase in commercial activity transacted over the Internet, known as "e-commerce", there has been much interest in the prior art on enabling transactions between computing platforms, over the Internet. However, because of the potential for fraud and manipulation of electronic data, in such proposals, fully automated transactions with distant in the prior art on enabling transactions between computing platforms, over the Internet. However, because of the potential for fraud and manipulation of electronic data, in such proposals, fully automated transactions with distant unknown parties on a wide-spread scale as required for a fully transparent and efficient market place have so far been held back. The fundamental issue is one of trust between interacting computer platforms for the making of such transactions.

There have been several prior art schemes which are aimed at increasing the security and trustworthiness of computer platforms. Predominantly, these rely upon adding in security features at the application level. That is to say the security features are not embedded in the kernel of operating systems, and are not built into the fundamental hardware components of the computing platform. Although such prior art schemes go some way to improving the security of computer platforms, the levels of security and trustworthiness gained by prior art schemes may be considered insufficient to enable widespread application of automated transactions between computer platforms, and greater confidence in the trustworthiness of the underlying technology is thought to be required for many applications.

In the applicant's co-pending International Patent Application No. PCT/GB00/00528 entitled "Trusted Computing Platform" and filed on Feb. 15, 2000, the entire contents of which are incorporated herein by reference, there is disclosed a concept of a 'trusted computing platform' comprising a computing platform which has a 'trusted component' in the form of a built-in hardware and software component. Two computing entities each provisioned with such a trusted component may interact with each other with a high degree of 'trust'. That is to say, where the first and second computing entities interact with each other the security of the interaction is enhanced compared to the case where no trusted component is present, because:

- A user of a computing entity has higher confidence in the integrity and security of his/her own computer and in the integrity and security of the computer entity belonging to the other computing entity.
- Each entity is confident that the other entity is in fact the entity which it purports to be.
- Where one or both of the entities represent a party to a transaction, e.g. a data transfer transaction, because of the in-built trusted component, third party entities interacting with the entity have a high degree of confidence that the entity does in fact represent such a party.
- The trusted component increases the inherent security of the entity itself, through verification and monitoring processes implemented by the trusted component.
- The computer entity is more likely to behave in the way it is expected to behave.

International Patent Application No. PCT/GB00/00528 describes a method of determining whether a target trusted platform is alive and trustworthy, by issuing an "integrity challenge" and receiving an "integrity response". This method has been further developed by the Trusted Computing Platform Alliance (TCPA), an industry consortium focussed on improving trust and security on computing platforms. In its version 1.0 of the Trusted Computing Platform Specifications, a clear direction is provided to industry that facilitates trust in computing platforms and environments. It defines a subsystem so that it may be trusted to operate as expected. The subsystem contains an isolated computing engine whose processes can be trusted because they cannot be altered. The specification also describes features that will enable a basic level of trust in a platform in order to be considered trustworthy by local users and by remote entities. In the TCPA specification, a trusted platform obtains a cryptographic identity that proves that the platform is a trusted platform. When a third party sends an integrity challenge (a nonce) to the platform, the platform appends a summary of integrity measurements to the nonce, then signs the concatenated data using the trusted identity. This functionality is provided by the TCPA command named QUOTE. The signed data returned by a QUOTE is used with other TCPA data to determine whether the platform will be trusted by the third party. Such determination is done by the third party, because the trustworthiness of a platform depends on the intended use of that platform, and only the third party is in a position to make that decision.

In the applicant's co-pending British Patent Application No. 0020441.2, filed on Aug. 18 2001 and entitled 'Performance of a Service on a Computing Platform', there is described a method of performing a service for a requestor on a computing platform, comprising the steps of the requestor providing to the computing platform a specification of the service to be performed, wherein the specification of the service establishes specified levels of trust for at least some of the processes in the service, the computing platform executing the service according to the specification and logging the performance of at least some of the processes for which a level of trust was specified, and providing the requestor with a log of the performance of the processes performed according to the specified levels of trust.

Thus, the disclosed method allows for the provision of evidence of satisfactory performance of services on a computing platform in response to an electronically received request. The service can be specified to the computing platform, and in addition to the results of the service (if these are required by the requester—these may be required elsewhere), the requestor is provided with evidence that the service has been satisfactorily performed by the computing platform.

While the methods described in the applicant's co-pending disclosures and the TCPA specification provide information that assists in determining whether a target platform may be considered trustworthy, none of them describe a method of indicating to a person that a target platform is considered trustworthy.

SUMMARY OF THE INVENTION

In accordance with a first aspect of the present invention, there is provided a host computing platform for accessing one or more electronic sites or services from a target computing platform, the host computing platform including means for visually indicating to a user thereof that said target computing platform includes a physically and logically protected computing environment.

Also in accordance with the first aspect of the present invention, there is provided a method of providing an electronic service via a remote target computing platform to a host computing platform, the method including the step of visually indicating on said host computing platform that said target computing platform includes a physically and/or logically protected computing environment.

In accordance with a second aspect of the present invention, there is provided a host computing platform for accessing one or more electronic sites or services from one or more remote target computing platforms, the host computing platform including means for providing a hyperlink within an active application running thereon, in the presence of which hyperlink, the host computing platform is adapted to continually or at intervals test whether or not said target computing platform is live and/or test the trustworthiness of said target platform, and to indicate, visually or otherwise, to a user of said host computing platform the liveness or otherwise and/or the trustworthiness or otherwise of said target computing platform.

Also in accordance with the second aspect of the present invention, there is provided a method of providing at a host computing platform an electronic site or service executed by a remote target computing platform, the method including the step of providing a hyperlink in an active document on said host computing platform, and, in response to the presence of said hyperlink, testing whether or not said target computing platform is live and/or testing the trustworthiness of said target computing platform and indicating to a user of said host computing platform the liveness or otherwise and/or the trustworthiness or otherwise of said target computing platform.

Thus, the present invention provides a method and apparatus for indicating to a person that a remote target platform is considered trustworthy. Such an indication may help a person initially select an electronic site or electronic service, and later provide confidence that a previously selected site or service continues to be trustworthy. The underlying intent of such an indication is to convey that the target platform may be considered trustworthy on the basis of the information in an integrity response and/or other supportive information (such as that specified in the above-mentioned TCPA specification), the user's policy and their intended use of the platform.

For the avoidance of doubt, the term "hyperlink" is intended to encompass any form of cross-reference in computer-readable text or code which allows direct or substantially immediate access to related material or the like. Thus, in this case, the hyperlink referred to in the second aspect of the present invention refers to a cross-reference in an electronic site or service (running on a target computing platform) which effectively allows direct access by a host computing platform (to which the site or service is being provided) to the target computing platform to test its liveness and/or its trustworthiness.

In the case of both the first and second aspects of the present invention, the indicating means is preferably in the form of a visual display on the screen of the host computing platform. The electronic site or service may be represented on the screen or display of a host computing platform by, for example, conventional source code or icons, all or a portion of which may be highlighted, marked, coloured differently or otherwise visually changed in the case where the service is being executed on a trusted computing platform. In one embodiment of the invention, such visual indication (regarding the liveness or otherwise of the target computing platform and/or the trustworthiness or otherwise of the target computing platform) may take the form of a particular colour (or change of colour) of a hyperlink or symbol associated with the hyperlink.

In accordance with a third aspect of the present invention, there is provided a method of providing an electronic site or service via a host computing platform, the method including the steps of executing said electronic site or service on a remote target computing platform which includes a physically and logically protected computing environment, and providing means in said electronic service for indicating, visually or otherwise, to a user of said service that said electronic service is being hosted by a computing platform which includes a physically and logically protected computing environment.

The third aspect of the present invention also extends to apparatus for providing an electronic site or service to a remote target computing platform, the apparatus comprising a host computing platform which includes a physically and logically protected computing environment, and means for indicating, visually or otherwise, to a user of said site or service that the electronic site or service is being hosted by a computing platform which includes a physically and logically protected computing environment.

The physically and/or logically protected computing environment referred to above may be that provided by a "trusted component" as described in the applicant's co-pending International Patent Application No. PCT/GB00/00528. In a preferred embodiment of the third aspect of the present invention, which beneficially concerns modifications to the visual representation of an electronic service, the electronic site or service (which is executed on a target computing platform) is represented on the screen or display of a host computing platform by, for example, conventional source code or icons, all or a portion of which may be highlighted, marked, coloured differently or otherwise visually changed in the case where the service is being executed on a trusted computing platform. The host computing platform may also be arranged to test, either continually or at intervals, the integrity (i.e. the trustworthiness) of the target computing platform executing the service.

Thus, the present invention is intended to provide a way of conveniently representing to a user the state of trust in a target computing platform, and in a preferred embodiment, a way of visually illustrating to a user that a site or service can be trusted (in the sense that it is executing on a trusted platform).

BRIEF DESCRIPTION OF THE DRAWINGS

Embodiments of the present invention will now be described by way of examples only, and with reference to the accompanying drawings, in which:

FIG. 5 is a flow diagram which illustrates schematically the functionality of a computing platform according to an exemplary embodiment of the present invention.

DETAILED DESCRIPTION OF THE INVENTION

In the following description, numerous specific details are set forth in order to provide a thorough understanding of the present invention. It will be apparent, however, to one skilled in the art, that the invention may be practiced without limitation to these specific details. In other instances, well known methods, structures and terms have not been described in detail so as to avoid unnecessarily obscuring the present invention.

Figure 1:
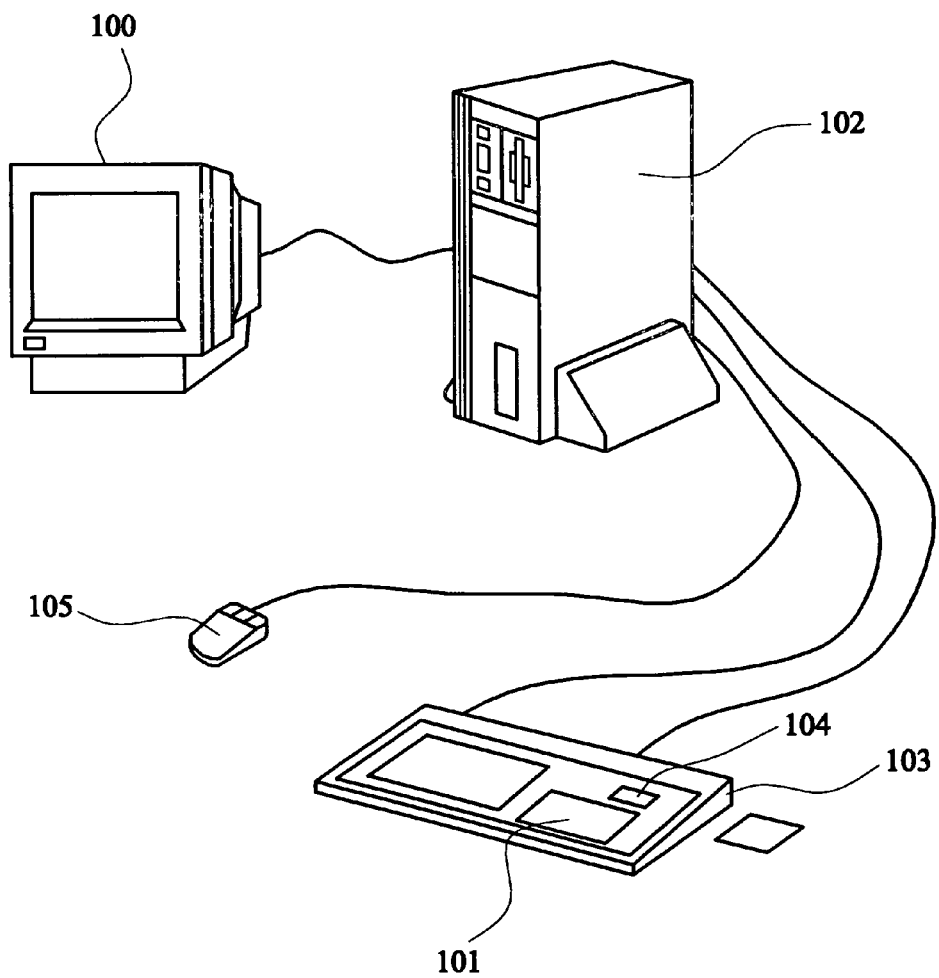
FIG. 1 illustrates schematically a trusted computing platform as previously described in the applicant's co-pending International Patent Application No. PCT/GB00/00528.
Figure 2:
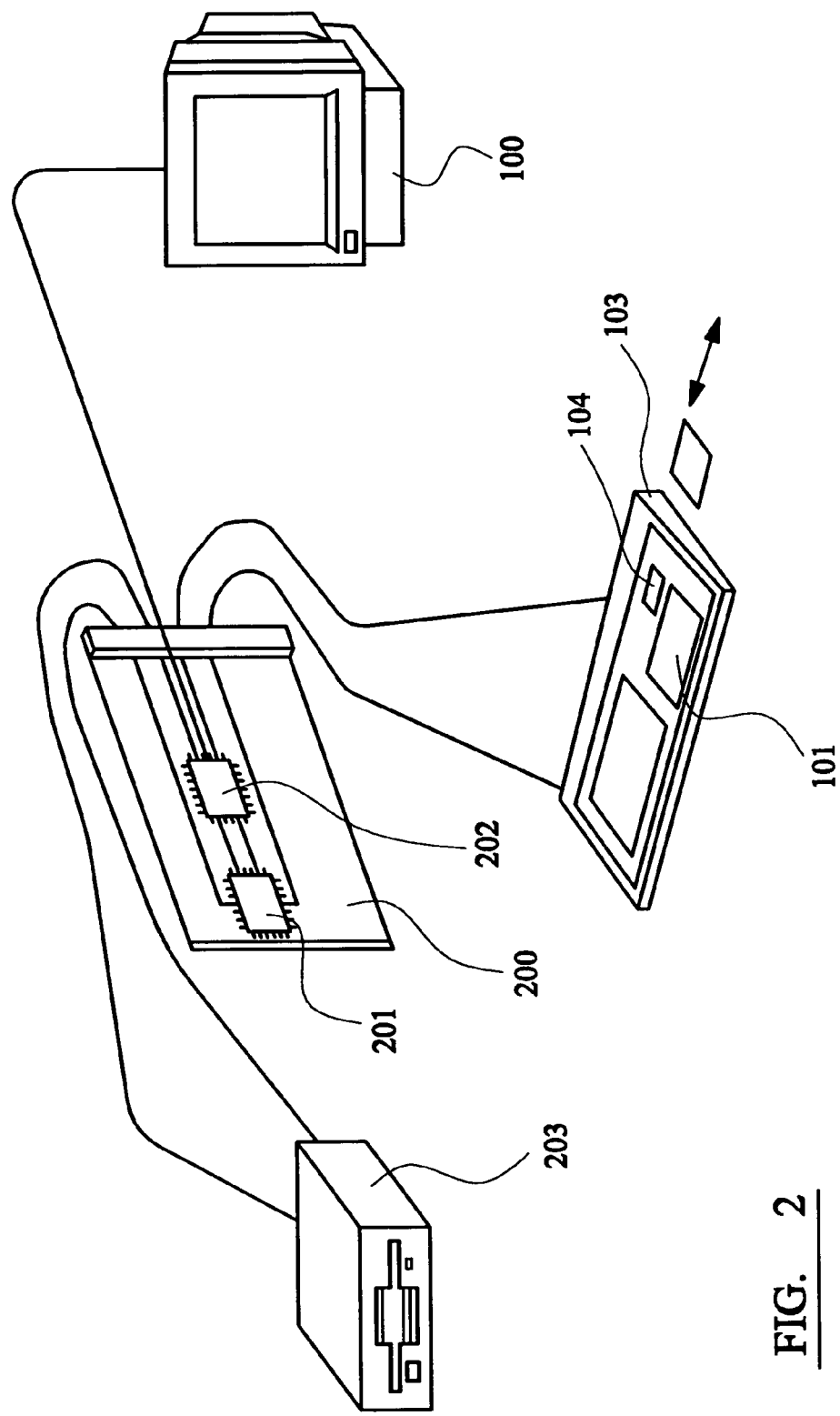
FIG. 2 illustrates schematically connectivity of selected components of the computing platform of FIG. 1.
Figure 3:
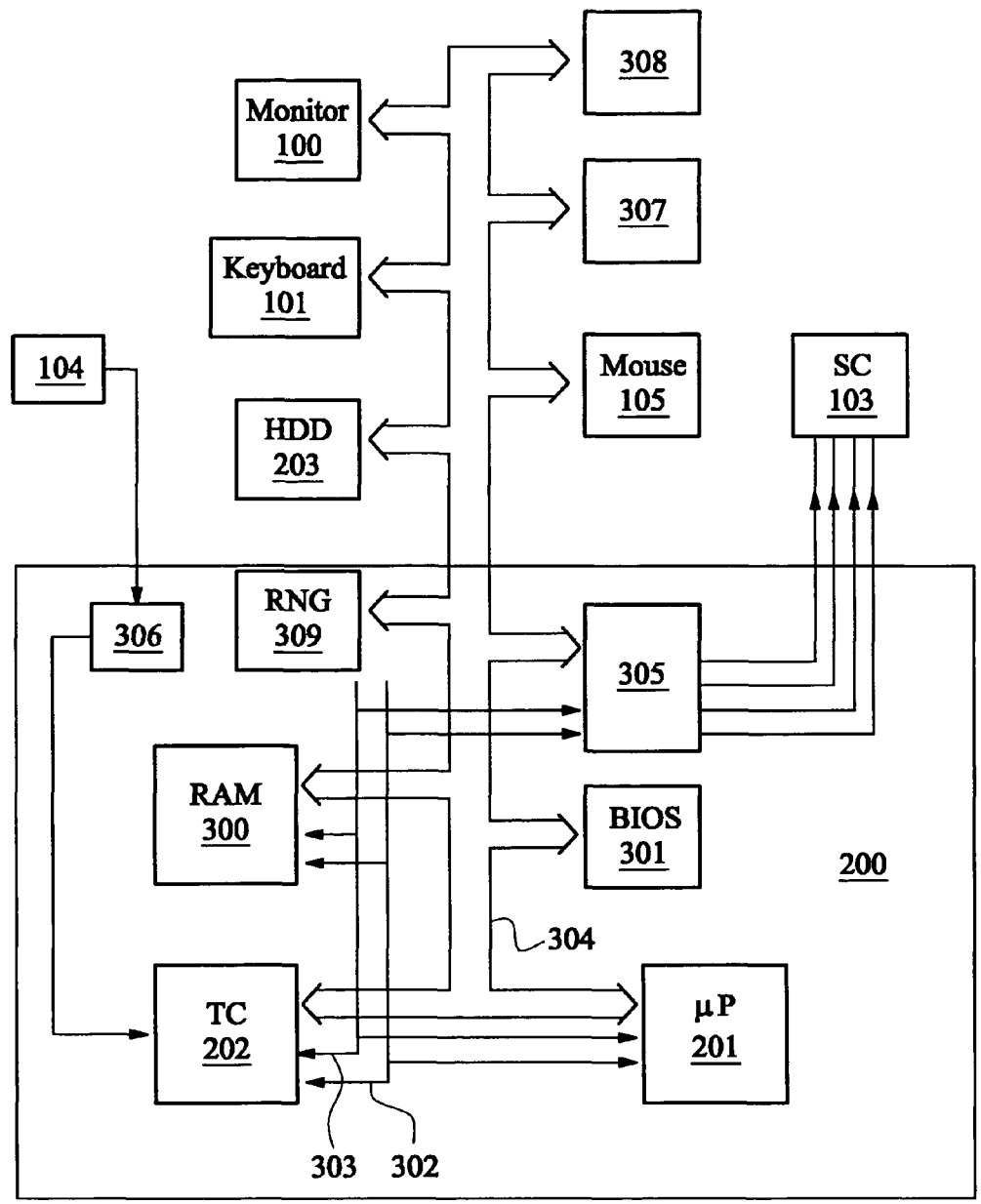
FIG. 3 illustrates schematically a hardware architecture of components of the computing platform of FIG. 1.
Figure 4:
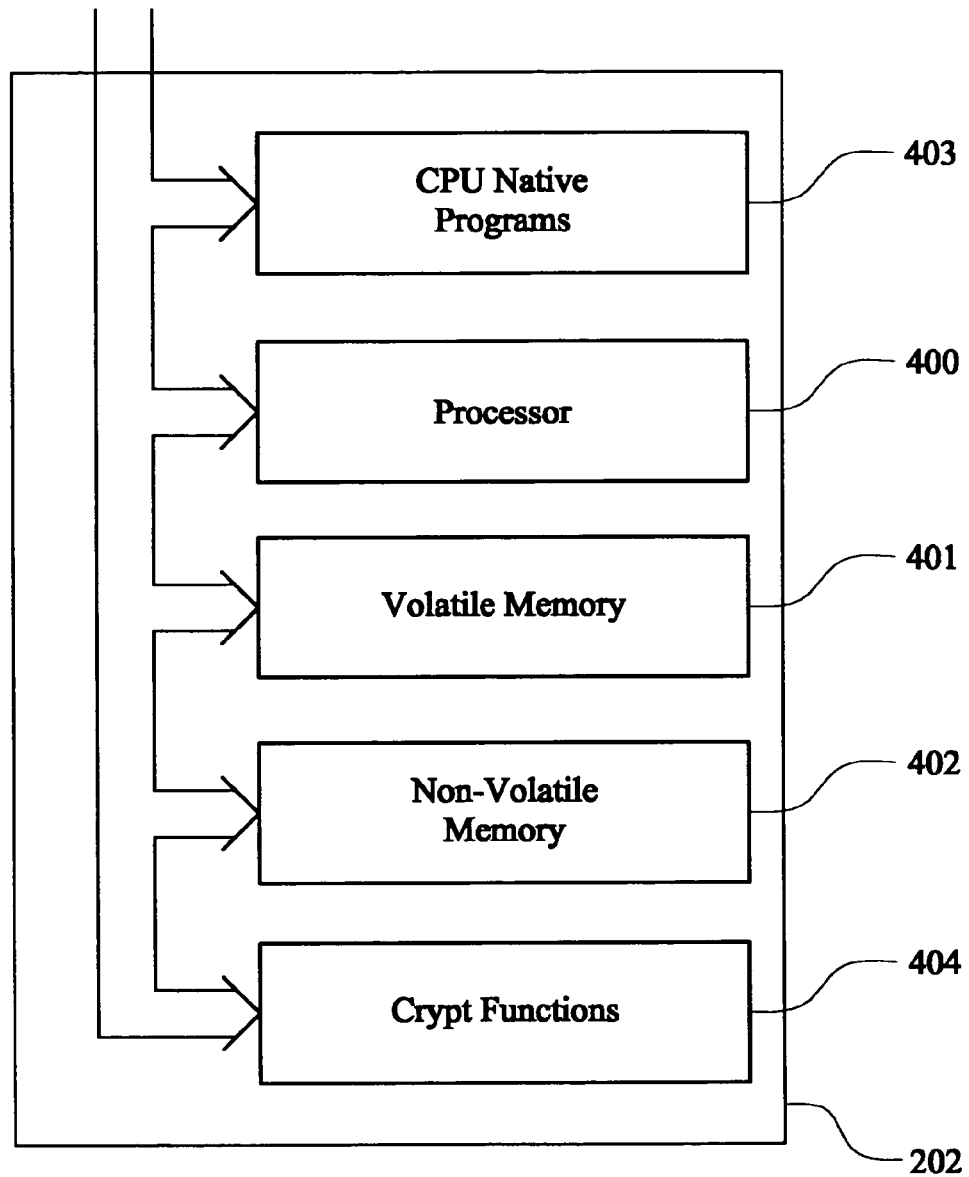
FIG. 4 illustrates schematically an architecture of a trusted component comprising the computing platform of FIG. 1.

Referring to FIG. 1 of the drawings, there is illustrated schematically one example of a trusted computing platform as previously described in the applicant's co-pending International patent application No. PCT/GB00/00528. Referring to FIG. 2, there is illustrated schematically the physical connectivity of some of the components of the trusted computing platform of FIG. 1. Referring to FIG. 3, there is illustrated schematically an architecture of the trusted computing platform of FIGS. 1 and 2, showing physical connectivity of components of the platform. Referring to FIG. 4, there is illustrated schematically an architecture of a trusted component included in the computing platform of FIG. 1.

In the example shown in FIGS. 1 to 4, the trusted computing platform is shown in the form of a personal computer suitable for domestic or business use. However, it will be understood by those skilled in the art that this is just one specific example of a trusted computing platform, and other examples may take the form of a palmtop computer, a laptop computer, a server-type computer, a mobile phone-type computer, information appliances, communication devices, display devices and hard copy devices generally, and the like, and the invention is limited only by the scope of the appended claims.

In the example illustrated by FIG. 1, the computing platform comprises a display monitor 100, a keyboard data entry means 101, a casing 102 comprising a motherboard on which is mounted a data processor, one or more data storage means, a dynamic random access memory, various input and output ports (not illustrated in FIG. 1), a smart card reader 103 for accepting a user's smart card, a confirmation key 104, which a user can activate when confirming a transaction via the trusted computing platform, and a pointing device, e.g. a mouse or trackball device 105. The trusted computing platform also has a trusted component as described in the applicant's previous disclosure and as further described herein.

Referring to FIG. 2 of the drawings, there are illustrated some of the components included in the trusted computing platform, including keyboard 101 which incorporates confirmation key 104 and a smart card reader 103, a main motherboard 200 on which is mounted first data processor 201 and trusted component 202, and example of a hard disk drive 203, and monitor 100. Additional components which may be included in the computing platform, such as an internal frame to the casing 102 housing one or more local area network (LAN) ports, one or more modem ports, one or more power supplies, cooling fans, and the like, are not shown in FIG. 2.

Referring to FIG. 3 of the drawings, main motherboard 200 is manufactured comprising a processor 201, and a preferably permanently fixed trusted component 202, a memory device 300 local to the processor, a BIOS memory area 301, smart card interface 305, a plurality of control lines 302, a plurality of address lines 303, a confirmation key interface 306, and a databus 304 connecting the processor 201, trusted component 202, memory area 300, BIOS memory area 301 and smart card interface 305. A hardware random number generator 309 is also able to communicate with the processor 201 using the bus 304.

External to the motherboard and connected thereto by the databus 304, are provided one or more hard disk drive memory devices 203, keyboard data entry device 101, pointing device 105, monitor 100, smart card reader 103, and one or more peripheral devices 307, 308, for example, a modem, printer, scanner, or other known peripheral device.

In the illustrated example, smart card reader 103 is wired directly to smart card interface 305 on the motherboard and does not connect directly to the databus 304. In an alternative example, however, the smartcard reader 103 may be connected directly to databus 304. To provide enhanced security, confirmation key switch 104 is hard wired directly to confirmation key interface 306 on motherboard 200, which provides a direct signal input to trusted component 202 when confirmation key 104 is activated by a user such that a user activation the confirmation key sends a signal directly to the trusted component, by-passing the first data processor and first memory means of the computer platform.

Trusted component 202 is positioned logically and physically between monitor 100 and processor 201 of the computing platform, so that trusted component 202 has direct control over the views displayed on monitor 100 which cannot be interfered with by processor 201.

Confirmation key 104 and confirmation key driver 306 provide a protected communication path (PCP) between a user and the trusted component, which cannot be interfered with by processor 201, which by-passes databus 304 and which is physically and logically unconnected to memory area 300 or hard disk drive memory device(s) 203.

The trusted component lends its identity and trusted processes to the computer platform and the trusted component has those properties by virtue of its tamper-resistance, resistance to forgery, and resistance to counterfeiting. Only selected entities with appropriate authorisation mechanisms are able to influence the processes running inside the trusted component. Neither an ordinary user of the trusted computer entity, nor any ordinary user or any ordinary entity connected via a network to the computer entity may access or interfere with the processes running inside the trusted component. The trusted component has the property of being "inviolate".

In the illustrated example, the trusted component operates to monitor data, including user data files and applications, on the computer platform by creating a set of data files which the trusted component dynamically monitors for any changes in the data, including absence of the data, which may occur as a result of the computer platform being compromised by a virus attack, or other interference. The trusted component is allocated or seizes a plurality of memory location addresses and/or file directories in the first memory area of the computer platform, which become a user space reserved for use by the trusted component.

The reserved memory area comprises a selected proportion of the total memory area of the computer platform. Within the reserved memory area, the trusted component also creates a plurality of data files, which can either be copies from real user data files on the computer platform, or which can be created by the trusted component. The primary purpose of these files is to act as a set of files to which the trusted component has access, and to which ordinary user accounts of the computer platform, under normal operation, do not have access. Because the files in the reserved memory area are reserved for use by the trusted component and under normal operation, are not accessed by applications on the computer platform, the trusted component can use files stored in the reserved memory area as a "control" set of files by which to monitor unauthorised changes to the data, for example as caused by a virus.

Because the files stored in the reserved memory area are either duplicates of user files, duplicates of applications or files created specifically by the trusted component, they are of little or no value to the computer platform for performing its normal operating functions. If the files in the reserved memory area become corrupted for any reason, they may be sacrificed and are easily replaceable. However, since access to the reserve memory area is restricted to the trusted component, any corruption of the files in the reserved memory area is deemed to be indicative of changes to files occurring through undesirable mechanisms, e.g. by a virus program. The files in the reserve memory area are periodically monitored by the trusted component to check for such corruption. If corruption is discovered by the monitoring process, then a measure of the likely corruption of the remaining memory area on the computer platform can be determined by probabilistic methods.

By providing a reserved memory area containing files which can be sacrificed, if the computer platform is compromised by a hostile attack, e.g. a virus, then the sacrificial files stored in the reserved memory area are at least as likely to be affected as other user data files stored in the remaining portion of the memory of the computer platform. Thus any corruption of the files in the reserved memory area, if detected early enough, may give an indication to the trusted component that file corruption is occurring on the computer platform, in which case the trusted component can take action to limit the spread of corruption at an early stage, and preferably before damage is done to important data files stored in the remaining memory area of the computer platform.

Referring to FIG. 4 of the drawings, there is illustrated schematically an internal architecture of trusted component 202. The trusted component comprises a processor 400, a volatile memory area 401, a non-volatile memory area 402, a memory area storing native code 403, and a memory area storing one or a plurality of cryptographic functions 404, the non-volatile memory 401, native code memory 403 and cryptographic memory 404 collectively comprising the second memory means hereinbefore referred to. The cryptographic functions 404 may include or comprise a source of random numbers.

Trusted component 202 comprises a completely independent computing entity from the computer platform. In the illustrated example, the trusted component shares a motherboard with the computer platform so that the trusted component is physically linked to the computer platform. In a preferred embodiment, the trusted component is physically distinct from the computer processing engine, that is to say it does not exist solely as a sub-functionality of the data processor and memory means comprising the computer platform, but exists separately as a separate physical data processor 400 and separate physical memory area 401, 402, 403, 404. By providing a physically separate trusted component, the trusted component becomes more difficult to mimic or forge through software introduced onto the computer platform. Programs within the trusted component are pre-loaded at manufacture of the trusted component, and are not generally user configurable. The physicality of the trusted component, and the fact that the trusted component is not configurable by the user enables the user to have confidence in the inherent integrity of the trusted component, and therefore a high degree of "trust" in the operation and presence of the trusted component on the computer platform.

The user's smart card may comprise a "cash card" or a "crypto card", the functions of which are described in the applicant's co-pending International Patent Application No. PCT/GB00/00751 filed on Mar. 3, 2000 and entitled 'Computing Apparatus and Methods of Operating Computing Apparatus'.

Referring now to FIG. 5 of the drawings, there is shown a flow diagram which illustrates schematically the functionality of a computing platform according to an exemplary embodiment of the present invention.

Consider the case where a user wishes to access a target site or service from a host platform. Prior to using a site or a service, a user indicated, at step 530, the intended use of the site or service, preferably by selecting a visual representation of the intended usage or intended service. Such a visual representation may exist exclusively for the purpose of representing the trustworthiness of an instantiation of a process providing the intended usage, or may be an adaptation of the normal representation of the intended usage.

The user then peruses, via the host platform, a selection of potential suppliers on target platforms. Each target may be visually indicated by, for example, an iconic symbol that incorporates an indication as to whether the relevant target platform has proven its trustworthiness to the host platform. The number of trust "states" is not intended to be limited. A range of symbols may be provided to represent various levels of trustworthiness. In the applicant's co-pending international patent application number PCT/GB00/03613 entitled "Operation of Trusted State in Computing Platform", the entire contents are incorporated herein by reference, there is described a computer platform which is capable of entering a plurality of different states of operation, each state of operation having a different level of security and trustworthiness. Selected ones of the states comprise trusted states in which a user can enter sensitive confidential information with a high degree of certainty that the computer platform has not been compromised by external influences such as viruses, hackers or hostile attacks. Each operating state can be distinguished from other operating states using a set of integrity metrics designed to distinguish between those operating states. The computer platform has a plurality of physical and logical resources, and each operating state utilises a corresponding respective set of the physical and logical resources.

Thus, in one exemplary embodiment of the invention, there are at least two trust state symbols, the first indicating that a target is considered trustworthy and the second indicating that a target has been found to be untrustworthy. In a more preferred embodiment, a third trust state symbol is provided to indicate that the trustworthiness of a target is unknown. However, it will be appreciated that other intermediate trust states may be provided for, as discussed in the above-mentioned co-pending application.

A target symbol may include the URL of the target and opening a symbol may reveal properties of the represented entity, or enable mutual control of administration processes, for example.

At step 540, the user choses a target for the intended usage, and the host platform takes the necessary actions (at step 500) to make a connection with a target computing platform and request the execution of a service, in accordance with a host user request.

While the site or service is being used, the host platform periodically verifies the trustworthiness of the selected site or service for the intended usage, and displays the appropriate version of iconic symbol for that target. At the same time, the visual representation of the intended usage indicates whether the usage is being provided by a trustworthy target.

In this example, in response to a request from the host platform to execute a service, a hyperlink is inserted (at step 510) into the active document now running on the host computing platform.

In response to the hyperlink, the host computing platform is arranged to test (either continually or at intervals) whether or not the target computing platform is live (at step 512) and also to test the trustworthiness of the target computing platform (at step 522). The liveness or otherwise of the target computing platform is displayed, at step 514, on the screen of the host computing platform, either in the form of a symbol associated with the hyperlink or a particular colour or format of the hyperlink itself. Similarly, at step 524, the trustworthiness or otherwise of the target computing platform is displayed to the host computing platform user.

In a first example, consider the case that a user wishes to ask for bids for the provision of an item or types of item. The user activates an icon that represents the type of purchase. This may take one form for low value purchases and another form for high value purchases, or may be a visual representation of a specification of a particular item, for example. The usage icon is added to a set of icons including icons representing target platforms that may act as vendors, or as agents for vendors. Initially these target icons are all of the type that indicate that the trustworthiness of the target for the intended purchase is unknown. The host platform interrogates the targets using an integrity challenge, gets the integrity responses back from the targets, then uses the integrity responses, together with supporting information the host platform's policies and the user's policies to determine whether a particular target is trustworthy enough to be asked to tender for the intended purchase. The type or visual representation of the target icon is then changed to trustworthy or untrustworthy, as appropriate. At some point, the user drags the item icon to a target icon or icons, and drops the item icon on the target icon or icons. This causes the host platform to ask the chosen target or targets to provide a bid for the provision of the item.

In a second example, consider the case that a user wishes to execute an electronic service on a target platform, where the methods to execute the service are already known to the target platforms. The service may be specialised or generic. The process proceeds as in the first example. At some point, the user drags the service icon onto a chosen target. This causes the host platform to request the chosen target to start the service, and the unsuccessful target icons are ghosted. While the service is running, the host periodically challenges the successful target and recomputes the trustworthiness (or not) of the successful target. The type of service icon indicates whether it is executing on a target that is considered trustworthy for that particular service. Naturally, it may be the policy of the host or the user that a service is not permitted to execute on a target that is untrustworthy for that particular service. So the host would not contact a target if the user dragged the service icon to an untrustworthy or unproven target. Similarly, the host may terminate a service if the host discovers that a previously trustworthy target has become untrustworthy.

In a third example, consider the case that a user wishes to execute an electronic service on a target platform, where the methods to execute the service are not known to the target platforms. The service could be an entire service and represented by a single icon, or could be part of a larger service and represented by multiple icons, or by modules of source code, or be represented by lines of source code, for example. The process proceeds as in the first example. At some point, the user drags service icons or modules or lines of code onto target icons. Each target executes the appropriate part of the service. So a target may execute all of a service, or part of a service (and be required to co-operate with other targets). While the service is running, the host periodically challenges the successful target(s) and recomputes the trustworthiness (or not) of the successful target(s). Again, it may be the policy of the host or the user that a service is not permitted to execute on a target that is untrustworthy for that particular service. So the host may refuse to start or continue a service on an untrustworthy target. While the service or part of a service is executing, the service icon changes to indicate the trustworthiness of the target providing that part of the service. In the case where the service is represented by textual source code, the trustworthiness of the target executing that code may be indicated by the colour or texture of the text or its background, for example.

In all cases, the request to use a target may be raised by an automatic process. In that case, the method described above is used merely to display the state of targets and/or services to a person, and the person (obviously) does not raise the request nor necessarily select particular targets.

Of course, the degree of effectiveness of the present invention is dependent on the level of trust a user has in their own computing platform. Ideally, the user would have a trusted computing platform, as described above with reference to FIGS. 1 to 4 of the drawings. However, while the concept of the above-described trusted component goes a long way to providing a user with a substantial degree of trust in a computer platform, there are still times when the user requires an even higher degree of trust in his equipment, for example during an electronic transaction, such as digitally signing a document, or digitally transferring funds from the platform to a remote platform.

The conventional method of signing a document is to physically write a signature on the medium (usually paper) upon which an image of a document is reproduced. This method has the advantages that it is clear what is being signed, and the signed image is proof of what was signed. However, it does not meet the needs of e-commerce.

Nowadays it is also possible to digitally sign a document, using a conventional computer platform and standard encryption techniques. In conventional computer platforms, however, the present inventors have appreciated that the electronic rendition of a document which is digitally signed is typically not the same rendition of the document that is visible to the user. It is therefore possible for a user to unintentionally sign data that is different from that which he intended to sign. Conversely, it is also possible for a user to intentionally sign data and later fraudulently claim that the signed data does not correspond to that displayed to him by the computer platform.

Such problems would still be present, even if a trusted platform, as described above, were used.

Conventional electronic methods of signing are well known to those skilled in the art. Essentially, digital data is compressed into a digest, for example by the use of a hash function. Then that digest is encrypted by the user of some encryption method that has been initialised by a secret key (or simply a 'secret'). This is normally done on a computer platform, such as a PC. One implementation is to sign data using a private encryption key held secret on a user's smartcard, which is plugged into a smartcard reader attached to the computer platform. In the specific case of a textual document, the digital data may be the file produced by a word processor application, such as Microsoft's Notepad, Wordpad, or Word. As usual, the act of signing implies that the signer accepts some legal responsibility for the meaning of the data that was signed.

Hash functions are well known in the prior art and comprise one way functions which are capable of generating a relatively small output data from a relatively large quantity of input data, where a small change in the input data results in a significant change in the output data. Thus, a data file to which is applied a hash function results in a first digest data (the output of the hash function). A small change e.g. a single bit of data in the original data file will result in a significantly different output when the hash function is reapplied to the modified data file. Thus, a data file comprising megabytes of data may be input into the hash function and result in a digital output of the order of 128 to 160 bits length, as the resultant digest data. Having a relatively small amount of digest data generated from a data file stored in the reserved directory is an advantage, since it takes up less memory space and less processing power in the trusted component.

During known signing processes, a user will typically interpret a document as it has been rendered on the computer's monitor at normal magnification and resolution. In existing applications, the user's smartcard signs data in a format that is the representation of the document by the application used to create and/or manipulate the document. The present inventors believe, however, that there is potential for software to send data to the smartcard that has a different meaning from that understood by the user when viewing the screen. This possibility may be sufficient reason to introduce doubt into the validity of conventional methods of digitally signing electronic representations of documents that are to be interpreted by people.

Thus, in the applicant's co-pending international patent application number WO00/73913 entitled "System for Providing a Trustworthy User Interface", the entire contents of which are incorporated herein by reference, the concept of a "trusted display" is introduced. The above-mentioned co-pending application describes a computer system which employs a trust display processor, which has a trusted processor and trusted memory physically and functionally distinct from the processor and memory of the computer system. The trust display processor is immune to unauthorised modification or inspection of internal data. It is physical to prevent forgery, tamper-resistant to prevent counterfeiting, and has crypto functions to securely communicate at a distance.

Obviously, the highest degree of effectiveness can be achieved by the present invention of the user's computer platform is a trusted computer platform having a trusted display. However, these are not essential to the usefulness of the present invention. For example, the user's platform may be a trusted computer platform which does not have a trusted display. Although the degree of trustworthiness of the user's equipment is somewhat reduced in these circumstances, the user may (a) not require the higher degree of trust provided by a trusted display or (b) have a greater degree of confidence in his own equipment than he would have in an unknown system, in which case the present invention is at least nearly as effective as it would be if the user's equipment included a trusted display.

Similarly, even if the user's platform is not a trusted computer platform, so that the degree of trustworthiness thereof is somewhat further reduced, the user may once again have sufficient confidence in his equipment for the present invention to be considered effective.

An embodiment of the present invention has been described above by way of example only, and it will be apparent to a person skilled in the art that modifications and variations can be made to the described embodiment without departing from the scope of the invention as defined by the appended claims.

The invention claimed is:

1. A host computing platform for accessing one or more electronic sites or services from a remote target computing platform, the host computing platform comprising:
   a trusted component to report whether a physically and logically protected computing environment exists in the remote target computing platform; and
   a display for visually confirming to a user thereof that said remote target computing platform exists in a physically and logically protected computing environment.

2. A host computing platform according to claim 1, wherein the display is to display a visual indication comprising at least one of a particular color, change of color, format, and change of format, of at least one of a hyperlink, symbol, and icon associated with or representing said remote target computing platform to visually confirm to the user that the remote target computing platform exists in a physically and logically protected computing environment.

3. A host computing platform according to claim 1, wherein said display is to visually confirm that the remote target computing platform exists in a physically and logically protected computing environment through display of a visual indication that comprises at least one of a plurality of symbols and icons, each of which represents a different level of trustworthiness of said remote target computing platform.

4. A host computing platform according to claim 1, wherein said output device comprises a display for providing a visual indication to a user of said host computing platform the trustworthiness of said remote target computing platform.

5. The host computing platform according to claim 1, wherein the trusted component includes circuitry to report whether the physically and logically protected computing environment exists in the remote target computing platform.

6. A host computing platform for accessing one or more electronic sites or services from one or more remote target computing platforms, the host computing platform comprising:
   an interface for providing a hyperlink to the one or more electronic sites or services within an active application running thereon;
   a trusted component to report whether a physically and logically protected environment exists in the remote target computing platform, wherein the trusted component is, in the presence of the hyperlink, to continually or at intervals test the trustworthiness of said remote target computing platform; and
   an output device to indicate to a user of said host computing platform the trustworthiness of said target computing platform.

7. A host computing platform according to claim 6, wherein the trusted component is to terminate access to said one or more electronic sites or services in the event that the remote target computing platform is determined to be untrustworthy.

8. A host computing platform according to claim 6, wherein said output device is to display at least one of a particular color, change of color, format and change of format, of at least one of a hyperlink, symbol, and icon associated with or representing said remote target computing platform.

9. A host computing platform according to claim 6, wherein said output device is to display a plurality of symbols or icons, each of which represents a different level of trustworthiness of the remote target computing platform.

10. The host computing platform according to claim 6, wherein the trusted component includes circuitry to report whether the physically and logically protected computing environment exists in the remote target computing platform.

11. A method of providing at a host computing platform an electronic site or service executed by a remote target computing platform, the method comprising:
 challenging, by the host platform, the remote target computing platform to obtain integrity metrics of the remote target computing platform, wherein the host computing platform includes a trusted component to report whether a physically and logically protected computing environment exists in the remote target computing platform;
 receiving integrity metrics from the remote target computing platform;
 evaluating, by the trusted component, the received integrity metrics against policies to assign a level of trust to the remote target computing platform; and
 visually providing an indication on said host computing platform corresponding to said assigned level of trust.

12. A method of providing at a host computing platform an electronic site or service executed by a remote target computing platform, the method comprising:
 providing a hyperlink to the electronic site or service in an active document on said host computing platform, and,
 in response to the presence of said hyperlink, testing, by a trusted component computing platform, the trustworthiness of said remote target computing platform, wherein the trusted component is to report whether a physically and logically protected environment exists in the remote target computing platform, and
 indicating to a user of said host computing platform the trustworthiness of said target computing platform.

13. A method of providing an electronic site or service to a remote target computing platform, the method comprising:
 executing the electronic site or service on a host computing platform including a physically and logically protected computing environment, and
 providing means within said electronic site or service for indicating to a user of said electronic site or service from a target computing platform that said electronic site or service is being hosted by a computing platform which includes circuitry for reporting whether a physically and logically protected computing environment exists in said remote target computing platform.

* * * * *

UNITED STATES PATENT AND TRADEMARK OFFICE
CERTIFICATE OF CORRECTION

PATENT NO.       : 8,584,245 B2                          Page 1 of 1
APPLICATION NO.  : 10/162020
DATED            : November 12, 2013
INVENTOR(S)      : Graeme John Proudler It is certified that error appears in the above-identified patent and that said Letters Patent is hereby corrected as shown below:

In the Claims

In column 13, line 8, in Claim 8, delete "format" and insert -- format, --, therefor.

In column 13, line 24, in Claim 11, delete "host" and insert -- host computing --, therefor.

In column 14, line 12, in Claim 12, after "component" insert -- in the host --.

Signed and Sealed this
Fourth Day of March, 2014

Michelle K. Lee
*Deputy Director of the United States Patent and Trademark Office*